(12) United States Patent
Nielsen et al.

(10) Patent No.: US 11,429,135 B1
(45) Date of Patent: Aug. 30, 2022

(54) CLOCK DISTRIBUTION SYSTEM

(71) Applicants: Max E. Nielsen, Caldwell, ID (US); Phillip Henry Fischer, Linthicum Heights, MD (US)

(72) Inventors: Max E. Nielsen, Caldwell, ID (US); Phillip Henry Fischer, Linthicum Heights, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 17/199,028

(22) Filed: Mar. 11, 2021

(51) Int. Cl.
*G06F 1/10* (2006.01)
*H01P 7/08* (2006.01)

(52) U.S. Cl.
CPC ................ *G06F 1/10* (2013.01); *H01P 7/082* (2013.01)

(58) Field of Classification Search
CPC .................................. G06F 1/10; H01P 7/082
USPC ........................................................ 327/304
See application file for complete search history.

(56) References Cited

U.S. PATENT DOCUMENTS

| | | | |
|---|---|---|---|
| 3,619,504 A | 11/1971 | De Veer et al. | |
| 5,365,205 A | 11/1994 | Wong | |
| 5,432,486 A | 7/1995 | Wong | |
| 5,638,402 A | 6/1997 | Osaka et al. | |
| 5,990,721 A | 11/1999 | Mellitz | |
| 6,098,176 A * | 8/2000 | Coteus | G06F 1/10 713/400 |
| 6,184,736 B1 | 2/2001 | Wissell et al. | |
| 6,229,861 B1 | 5/2001 | Young | |
| 6,563,357 B1 | 5/2003 | Hsu et al. | |
| 6,563,358 B1 | 5/2003 | Goulette | |
| 6,978,328 B1 | 12/2005 | Osaka et al. | |
| 7,145,408 B2 | 12/2006 | Shepard et al. | |
| 7,880,551 B2 | 2/2011 | Chan et al. | |
| 8,525,569 B2 | 9/2013 | Bucelot et al. | |
| 9,509,490 B1 | 11/2016 | Dabral | |
| 9,634,654 B2 | 4/2017 | Bucelot et al. | |

(Continued)

FOREIGN PATENT DOCUMENTS

| | | |
|---|---|---|
| JP | H05324121 A | 12/1993 |
| JP | H0854957 A | 2/1996 |

(Continued)

OTHER PUBLICATIONS

International Search Report for Application No. PCT/US2020/053319 dated Mar. 16, 2021.

(Continued)

*Primary Examiner* — Tomi Skibinski
(74) *Attorney, Agent, or Firm* — Tarolli, Sundheim, Covell & Tummino LLP

(57) ABSTRACT

One example includes a clock distribution system. The system includes a resonator feed network comprising a plurality of resonant transmission lines that each propagate a clock signal. The system also includes at least one resonator spine. Each of the at least one resonator spine can be conductively coupled to at least one of the resonant transmission lines, such that each of the at least one resonator spine propagates the clock signal. The system further includes at least one resonator rib conductively coupled to at least one of the at least one resonator spine. Each of the at least one resonator rib can be arranged as a standing wave resonator to propagate the clock signal.

19 Claims, 6 Drawing Sheets

(56) References Cited

U.S. PATENT DOCUMENTS

| | | |
|---|---|---|
| 9,722,589 B1 | 8/2017 | Talanov et al. |
| 9,939,841 B1 | 4/2018 | Dusatko |
| 10,133,299 B1 | 11/2018 | Strong et al. |
| 10,331,163 B1 | 6/2019 | Luo |
| 10,431,867 B1 | 10/2019 | Strong et al. |
| 10,474,183 B2 | 11/2019 | Strong et al. |
| 10,520,974 B2 | 12/2019 | Strong et al. |
| 10,591,952 B1 | 3/2020 | Strong et al. |
| 10,754,371 B1 | 8/2020 | Strong et al. |
| 10,884,450 B2 | 1/2021 | Strong et al. |
| 2005/0057286 A1 | 3/2005 | Shepard et al. |
| 2007/0285179 A1 | 12/2007 | Ikeda et al. |
| 2009/0146748 A1 | 6/2009 | Pernia et al. |
| 2014/0210518 A1 | 7/2014 | Chang et al. |
| 2016/0125309 A1 | 5/2016 | Naaman et al. |
| 2016/0370822 A1 | 12/2016 | Strong et al. |
| 2019/0278321 A1* | 9/2019 | Strong .............. H01L 23/66 |
| 2021/0080995 A1 | 3/2021 | Strong et al. |

FOREIGN PATENT DOCUMENTS

| | | |
|---|---|---|
| JP | 20058267289 A | 9/2005 |
| WO | 20160209387 A1 | 12/2016 |

OTHER PUBLICATIONS

Li Guansheng et al. "Standing wave based clock distribution technique with application to a 10 × 11 Gbps transceiver in 28 nm CMOS", 2015 IEEE Asian Solid-State Circuits Conference (A-SSCC), IEEE, Nov. 9, 2015, pp. 1-4, XP032852612, DOI10.1109/ASSCC.2015.7387451, figure 5.

Australian Examination Report for Application No. 2016283778 dated Feb. 8, 2021.

Quentin P Herr Et al., "Ultra-Low-Power Superconductor Logic", arxiv.org, Cornell University Library, 201 Olin Library Cornell University Ithaca, NY 14853, Mar. 22, 2011, XP080545411, doi: 10.1063/1.3585849 the whole document.

Sasaki, A High-Frequency Clock Distribution Network Using Inductively Loaded Standing-Wave Oscillators (Year: 2009).

V.L. Chi, "Salphasic Distribution of Clock Signals for Synchronous Systems", IEEE Transactions on Computers, IEEE Service Center, vol. 43, No. 5, May 1, 1994.

\* cited by examiner

CLOCK DISTRIBUTION SYSTEM

TECHNICAL FIELD

This disclosure relates generally to computer systems, and specifically to a clock distribution system.

BACKGROUND

Typical circuits that implement logic functions can operate based on a clock to synchronize data and/or provide a time-based flow of the logic functions. Circuits that are based on complementary metal-oxide-semiconductor (CMOS) technology can implement a clock to indicate when a given logic circuit or gate is to capture data at one or more inputs for processing or transferring the data to other logic functions. A given clock can thus provide a clock signal to a variety of devices in the circuit to provide the requisite timing information, and thus to substantially synchronize data transfer and timing functions. Other types of circuits can implement clock signals, such as reciprocal quantum logic (RQL) circuits. RQL circuits can implement timing information based on a clock that is provided, for example, as a sinusoidal signal having a substantially stable-frequency.

SUMMARY

One example includes a clock distribution system. The system includes a resonator feed network comprising a plurality of resonant transmission lines that each propagate a clock signal. The system also includes at least one resonator spine. Each of the at least one resonator spine can be conductively coupled to at least one of the resonant transmission lines, such that each of the at least one resonator spine propagates the clock signal. The system further includes at least one resonator rib conductively coupled to at least one of the at least one resonator spine. Each of the at least one resonator rib can be arranged as a standing wave resonator to propagate the clock signal.

Another example includes a clock distribution system. The system includes a resonator feed network comprising a plurality of resonant transmission lines that each propagate a clock signal. The system also includes at least one resonator spine. Each of the at least one resonator spine can be conductively coupled to at least one of the resonant transmission lines a plurality of the resonant transmission lines of the resonator feed network at each of a plurality of locations separated by at least one interval along a length of the respective one of the at least one resonator spine, such that each of the at least one resonator spine propagates the clock signal. The system further includes at least one resonator rib conductively coupled to at least one of the at least one resonator spine. Each of the at least one resonator rib can be arranged as a standing wave resonator to propagate the clock signal.

Another example includes a clock distribution system. The system includes a resonator feed network comprising a first set of resonant transmission lines and a second set of resonant transmission lines. Each of the first and second sets of resonant transmission lines can have a quantity greater than one and can be configured to propagate a clock signal. The system also includes a first resonator spine conductively coupled to the first set of resonant transmission lines, such that the first resonator spine propagates the clock signal, and a second resonator spine conductively coupled to the second set of resonant transmission lines, such that the second resonator spine propagates the clock signal. The system further includes at least one resonator rib conductively coupled to each of the first and second resonator spines. Each of the at least one resonator rib can be arranged as a standing wave resonator to propagate the clock signal.

DETAILED DESCRIPTION

Figure 1:
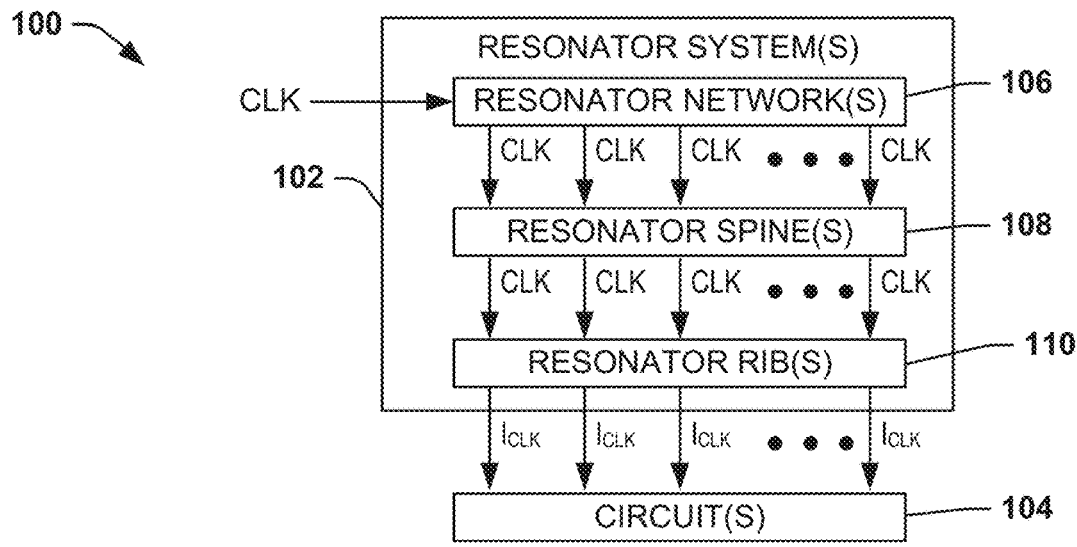
FIG. 1 illustrates an example of a clock distribution system.

This disclosure relates generally to computer systems, and specifically to a clock distribution system. The clock distribution system, as described herein, is arranged as a resonator "spine" and "rib" configuration. As described herein, the term "spine", as pertaining to the resonator, describes a conductor that is configured to propagate a clock signal (e.g., an in-phase or quadrature-phase clock signal). The term "rib", as pertaining to the resonator, describes a conductor that is conductively coupled to the spine and is arranged as a standing-wave resonator that propagates the clock signal. The clock distribution system can include a plurality of resonator ribs that are each conductively coupled to the same resonator spine, and thus can each separately propagate the clock signal from the resonator spine. For example, the clock distribution system can be arranged as dynamic zeroth-order resonators ("DynaZORs") that implement a resonator "spine" and "rib" configuration, such as described in U.S. Pat. No. 10,133,299, which is incorporated herein by reference in its entirety.

The clock distribution system includes a resonator feed network that includes a plurality of resonant transmission lines that are each configured to propagate a clock signal (e.g., a sinusoidal clock signal). As an example, each of the resonant transmission lines of the resonator feed network are conductively coupled to each other and to a clock source at a first end of each of the resonant transmission lines. For example, each of the resonant transmission lines can include at least one transmission line having a predetermined length, such that each of the resonant transmission lines can have a total length of approximately one-half of a wavelength of the clock signal.

The clock distribution system also includes at least one resonator spine that is conductively coupled to at least one of the resonant transmission lines of the resonator feed network. Therefore, the resonator spine(s) can likewise propagate the clock signal. For example, the clock distribution system can include a plurality of resonator spines that are each conductively coupled to at least one of the resonant transmission lines. Each of the resonator spines can therefore be coupled to multiple resonant transmission lines (e.g., at predefined intervals along the length of the resonator spine(s). Because each of the resonant transmission lines can be coupled together at a first end and have approximately one-half wavelength total length, the distance between any two given conductive couplings of respective resonant transmission lines to the resonator spine(s) can have a total length of approximately one wavelength, and therefore approximately equal amplitude. As a result, the coupling of the resonator(s) to the resonator spine(s) can increase uniformity of amplitude of the clock signal along the length of the resonator spine(s). Furthermore, amplitude aberrations of other frequency modes of the clock signal can be suppressed to provide for further uniformity of the amplitude of the clock signal. Accordingly, amplitude variations of the clock signal resulting from frequency mode deviations based on fabrication process variations of a given integrated circuit (IC) can be mitigated.

FIG. 1 illustrates an example of a clock distribution system 100. The clock distribution system 100 can be implemented in a variety of applications, such as superconducting circuits (e.g., a reciprocal quantum logic (RQL) circuits). For example, the clock distribution system 10 can be implemented in or as part of an integrated circuit (IC).

The clock distribution system 100 includes at least one resonator system 102. As described herein, the term "resonator system" describes at least one resonator that includes a spine and rib architecture to propagate a clock signal CLK. As an example, the clock signal CLK can be a sinusoidal clock signal. The resonator system(s) 102 can be configured to provide the clock signal CLK (e.g., generated from an oscillator) to each of a respective one or more circuits 104 that may be distributed across an IC in which the clock distribution system 100 is implemented, as described herein. In the example of FIG. 1, each of the resonator system(s) 102 includes at least one resonator feed network 106, at least one resonator spine 108, and at least one resonator rib 110. The resonator spine(s) 108 are conductively coupled to at least one resonator of the resonator feed network(s) 106, and the resonator rib(s) 110 are each conductively coupled to a given one or more of the resonator spine(s) 108. Thus, the clock signal CLK, provided to the resonator feed network(s) 106 (e.g., from a local oscillator), can be provided to propagate through the resonator feed network(s), through the resonator spine(s) 108, and through each of the respective resonator rib(s) 110.

In the example of FIG. 1, the circuit(s) 104 are coupled to the resonator rib(s) 110, such as inductively via respective transformer-coupling lines, to provide a clock current $I_{CLK}$ to an associated one of the circuit(s) 104. Therefore, the clock current $I_{CLK}$ can be provided to the circuit(s) 104 to provide functions (e.g., timing functions and/or power distribution functions) for the associated circuit(s) 104. Because the circuit(s) 104 can be distributed across the respective IC, substantial uniformity of the clock signal CLK can provide for more accurate timing and interaction between the circuit(s) 104. Furthermore, due to fabrication and process tolerance mismatches, the frequency of the clock signal CLK can vary relative to the resonant frequency of the resonant transmission lines that form the resonator feed network(s) 106, the resonator spine(s) 108, and the resonator rib(s) 110. The frequency variations of the clock signal CLK can provide for off-resonance frequency modes of the clock signal CLK on a given IC or between separate ICs, which can vary the amplitude of the clock signal CLK along a given length of the resonator spine(s) 108. To mitigate variations in amplitude along the length of the resonator spine(s) 108, as described herein, there can be a multitude of different configurations of the connection of the resonant transmission lines of the resonator feed network(s) 106 to the respective resonator spine(s) 108.

Figure 2:
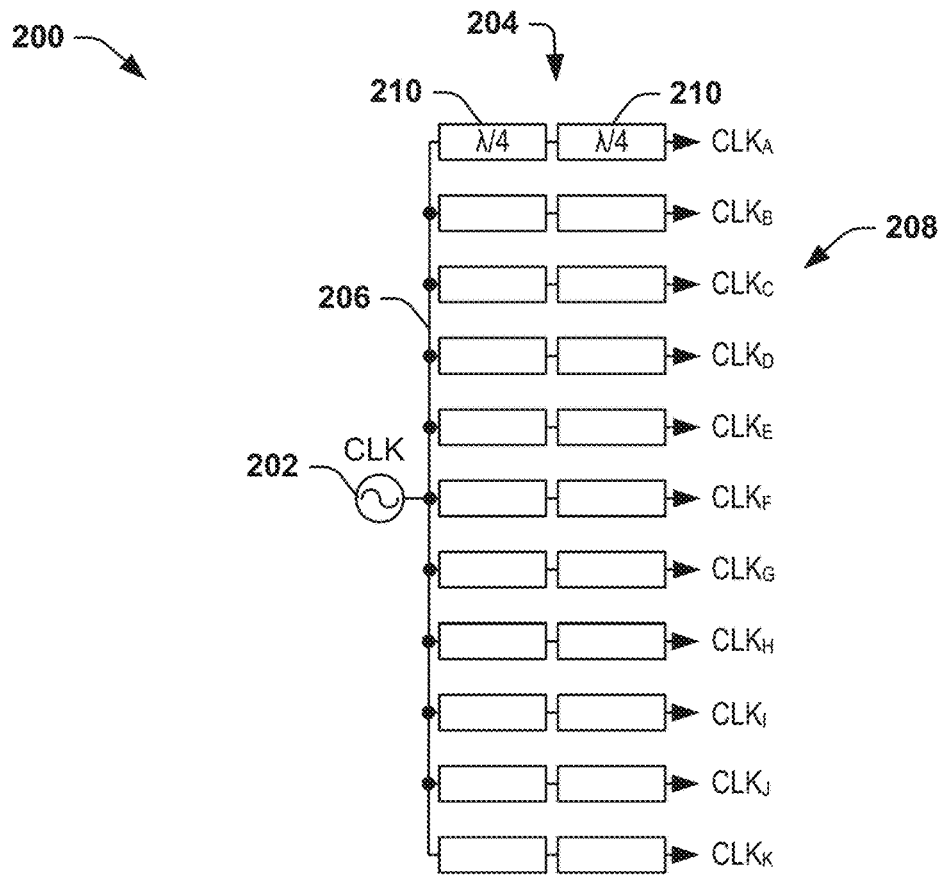
FIG. 2 illustrates an example of a resonator feed network.

FIG. 2 illustrates an example of a resonator feed network 200. As an example, the resonator feed network 200 can be coupled to a carrier supporting one or more ICs (e.g., via bump bonds) to provide the clock signal CLK to the remaining portions of a given resonator system (e.g., resonator spine(s)), as described herein. The resonator feed network 200 can correspond to one of the resonator feed network(s) 106 in the example of FIG. 1. Therefore, reference is to be made to the example of FIG. 1 in the following description of the example of FIG. 2.

The resonator feed network 200 includes an oscillator 202 configured to generate a clock signal CLK. As an example, the clock signal CLK can be a sinusoidal clock signal, and can correspond to one of the components of a quadrature RQL clock signal (e.g., an in-phase component or a quadrature-phase component). In the example of FIG. 2, the resonator feed network 200 also includes a plurality of resonant transmission lines 204. The resonant transmission lines 204 are demonstrated as conductively coupled together and to the oscillator 202 at a node 206 at a first end, and include respective outputs 208 at a second end. In the example of FIG. 2, the outputs 208 are demonstrated as a quantity of eleven, and thus provide respective approximately identical clock signals $CLK_A$ through $CLK_K$. However, other quantities greater than or less than eleven are possible for the clock distribution system, as described herein. As described herein, the clock signals $CLK_A$ through $CLK_K$ correspond to approximately equal copies of the clock signal CLK, and are therefore all approximately equal with respect to frequency and amplitude.

In the example of FIG. 2, the resonant transmission lines 204 are each demonstrated as including two transmission line segments 210. Each of the transmission line segments 210 is demonstrated as having a length of "$\lambda/4$", and thus one-quarter of the wavelength "$\lambda$" of the clock signal CLK. However, the lengths of the transmission line segments 210 can deviate from one quarter wavelength, and are hereinafter understood to be approximately $\lambda/4$. Therefore, the total length of each of the resonant transmission lines 204 is approximately $\lambda/2$, and thus approximately half the wavelength of the clock signal CLK. As a result, the length between any two of the outputs 208, through a total of four of the transmission line segments 210, is approximately one wavelength "$\lambda$" of the clock signal CLK. Therefore, the amplitude of the clock signal CLK at each of the outputs 208 is approximately equal. As described herein, the example of FIG. 2 is demonstrated diagrammatically, such that the distance between resonant transmission lines 204 at the node 206 is negligible (e.g., approximately zero).

As described in greater detail herein, the outputs 208 of the resonant transmission lines 204 are coupled to the resonator spine(s) of the clock distribution system. For example, the resonant transmission lines 204 can include two separate $\lambda/4$ length transmission line segments 210, as demonstrated in the example of FIG. 2, to improve frequency and amplitude response of the resonator 204. As an example, there can be an impedance mismatch between the transmission line segment 210 that is coupled to resonator spine at the respective output 208 and the transmission line segment 210 coupled to the oscillator 202 (and the other resonant transmission lines 204). However, the resonant transmission lines 204 can instead include transmission line segments of other lengths, such as a single $\lambda/2$ length transmission line segment, or any other even multiple of $\lambda/4$ length transmission line segments.

Figure 3:
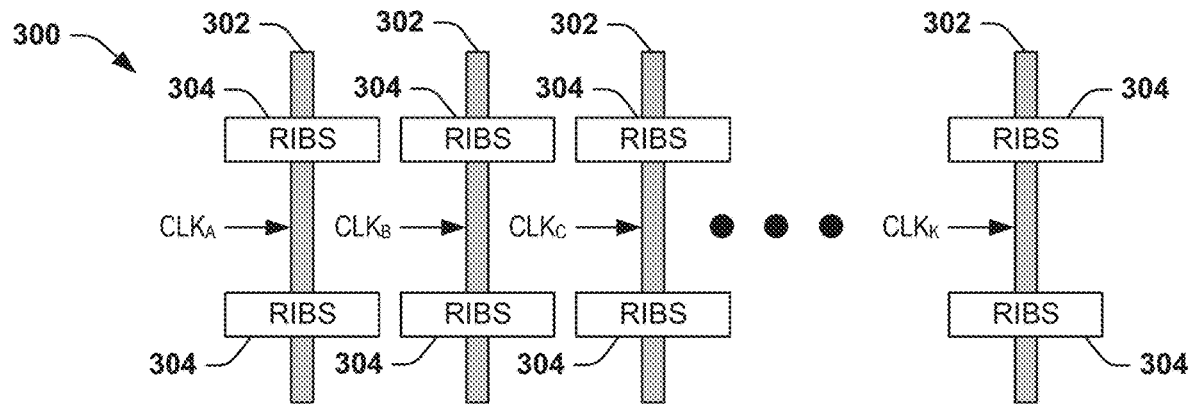
FIG. 3 illustrates another example of a clock distribution system.

FIG. 3 illustrates another example of a clock distribution system 300. The clock distribution system 300 can correspond to a portion of the clock distribution system 102 in the example of FIG. 1. Therefore, reference is to be made to the example of FIGS. 1 and 2 in the following description of the example of FIG. 3.

The clock distribution system 300 includes a plurality K of resonator spines 302, where K corresponds to the eleventh one of the resonator spines 302. The clock distribution system 300 also includes a plurality of sets of resonator ribs 304 that are coupled to each of the resonator spines 302. As described above, the clock distribution system 300 can include circuits (not shown in the example of FIG. 3) that are coupled (e.g., inductively) to the resonator ribs 304. In the example of FIG. 3, each of the resonator spines 302 receives the clock signal CLK, demonstrated as the respective clock signals $CLK_A$ through $CLK_K$ as described above. Therefore, each of the resonator spines 302 is coupled to one of the outputs 208 of the respective resonant transmission lines 204 in the example of FIG. 2.

In the example of FIG. 3, the clock signals $CLK_A$ through $CLK_K$ are provided at approximately a midpoint along the length of the resonator spines 302. As an example, the resonator spines 302 can all be approximately the same length, which can be approximately equal to a wavelength $\lambda$ or a multiple of the wavelength of the clock signal CLK. As a result, the resonator spines 302 can operate as standing-wave resonators. For example, the resonator ribs 304 can be conductively coupled to the respective resonator spines 302 at approximate anti-node portions of the respective clock signals $CLK_A$ through $CLK_K$ propagating in standing-wave manner on the respective resonator spines 302. Therefore, the resonator ribs 304 can each propagate the respective one of the clock signals $CLK_A$ through $CLK_K$ at an approximately equal amplitude to provide uniformity of the clock current $I_{CLK}$ to respective circuits that are coupled to the resonator ribs 304.

Additionally, because each of the resonator spines 302 is provided a respective one of the clock signals $CLK_A$ through $CLK_K$, the resonator spines 302 can propagate the clock signal CLK approximately uniformly with respect to each other, as opposed to typical resonator systems that provide a clock signal to one resonator (e.g., resonator spine) of a group of resonator spines that implement conductive cross-connections between them (e.g., through ribs or other conductors between the respective resonator spines 302). For example, as described above, the length from one of the resonator spines 302 to any other one of the resonator spines 302 through the resonant transmission lines 204 that provide the respective clock signals $CLK_A$ through $CLK_K$ is approximately one wavelength $\lambda$ of the clock signal CLK. Therefore, the resonator spines 302 are all conductively coupled through the resonant transmission lines 204, and the amplitude of the clock signals $CLK_A$ through $CLK_K$ can be approximately uniformly applied to each of the resonator spines 302. As a result, the clock distribution system 300 can exhibit greater uniformity of the clock signal CLK in each of the resonator spines 302 relative to an arrangement in which the clock signal CLK is provided to only one of the resonator spines 302 that are conductively coupled through cross-bars or the resonator ribs 304.

Figure 4:
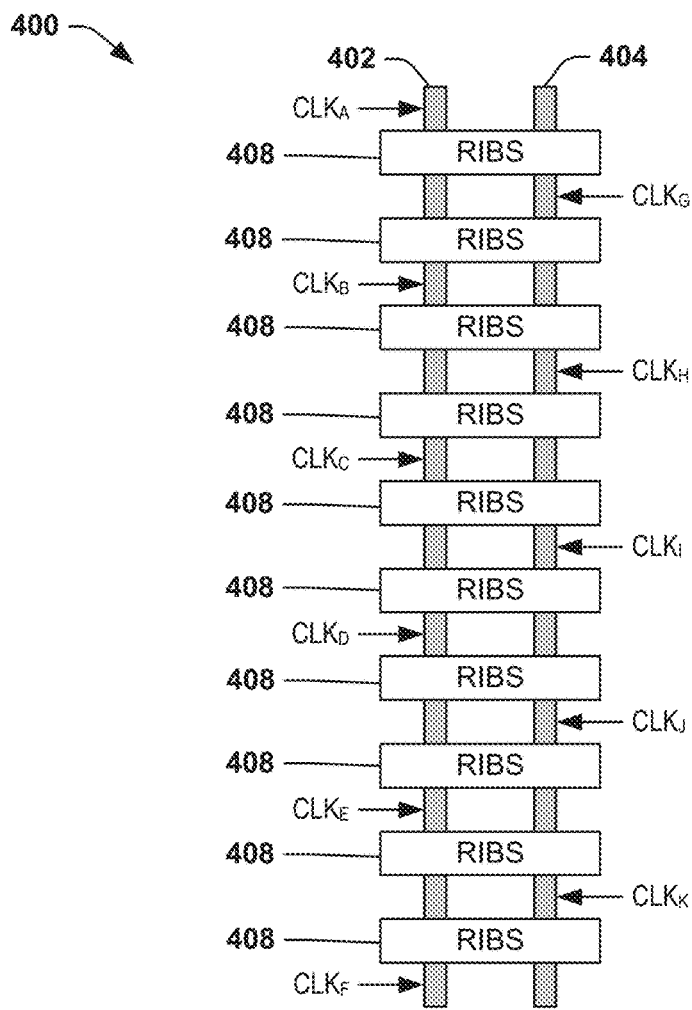
FIG. 4 illustrates another example of a clock distribution system.

FIG. 4 illustrates another example of a clock distribution system 400. The clock distribution system 400 can correspond to a portion of the clock distribution system 102 in the example of FIG. 1. Therefore, reference is to be made to the example of FIGS. 1 and 2 in the following description of the example of FIG. 4.

The clock distribution system 400 includes a first resonator spine 402 and a second resonator spine 404. The clock distribution system 400 also includes a plurality of sets of resonator ribs 408 that are coupled to each of the resonator spines 402 and 404. As an example, the first and second resonator spines 402 and 404 can nominally be fabricated to be approximately equal in length. As a first example, each of the resonator ribs 408 can be coupled to the resonator spines 402 and/or 404. As described above, the clock distribution system 400 can include circuits (not shown in the example of FIG. 4) that are coupled (e.g., inductively) to the resonator ribs 408.

The resonator spines 402 and 404 receive the clock signal CLK, demonstrated as the respective clock signals $CLK_A$ through $CLK_K$ as described above. In the example of FIG. 4, the clock signals $CLK_A$ through $CLK_F$ are provided to the first resonator spine 402 and the clock signals $CLK_G$ through $CLK_K$ are provided to the second resonator spine 404. The clock signals $CLK_A$ through $CLK_K$ can be provided at locations along the length of the resonator spines 402 and 404 at predetermined equal intervals between the sets of resonator ribs 408. As an example, the intervals between each of the conductive coupling of the clock signals $CLK_A$ through $CLK_F$ to the first resonator spine 402 and the intervals between each of the conductive coupling of the clock signals $CLK_G$ through $CLK_K$ to the second resonator spine 404 can be approximately equal along the length of the respective first and second resonator spines 402 and 404.

Based on the coupling of multiple copies of the clock signal CLK (e.g., the clock signals $CLK_A$ through $CLK_F$ to the first resonator spine 402 and the clock signals $CLK_G$ through $CLK_K$ to the second resonator spine 404), the clock signal CLK can propagate on the first and second resonator spines 402 and 404 with a substantially more uniform amplitude along the length of the first and second resonator spines 402 and 404, as described in greater detail herein. Furthermore, amplitude variations of the clock signal CLK resulting from additional frequency modes that are stimulated when the operating frequency differs from the as-fabricated resonant frequency of the respective first and second resonator spines 402 and 404, and the ribs connected to the first and second resonator spines 402 and 404, can be suppressed based on the multiple conductive couplings of the clock signal CLK to the first and second resonator spines 402 and 404, as described in greater detail herein.

Figure 5:
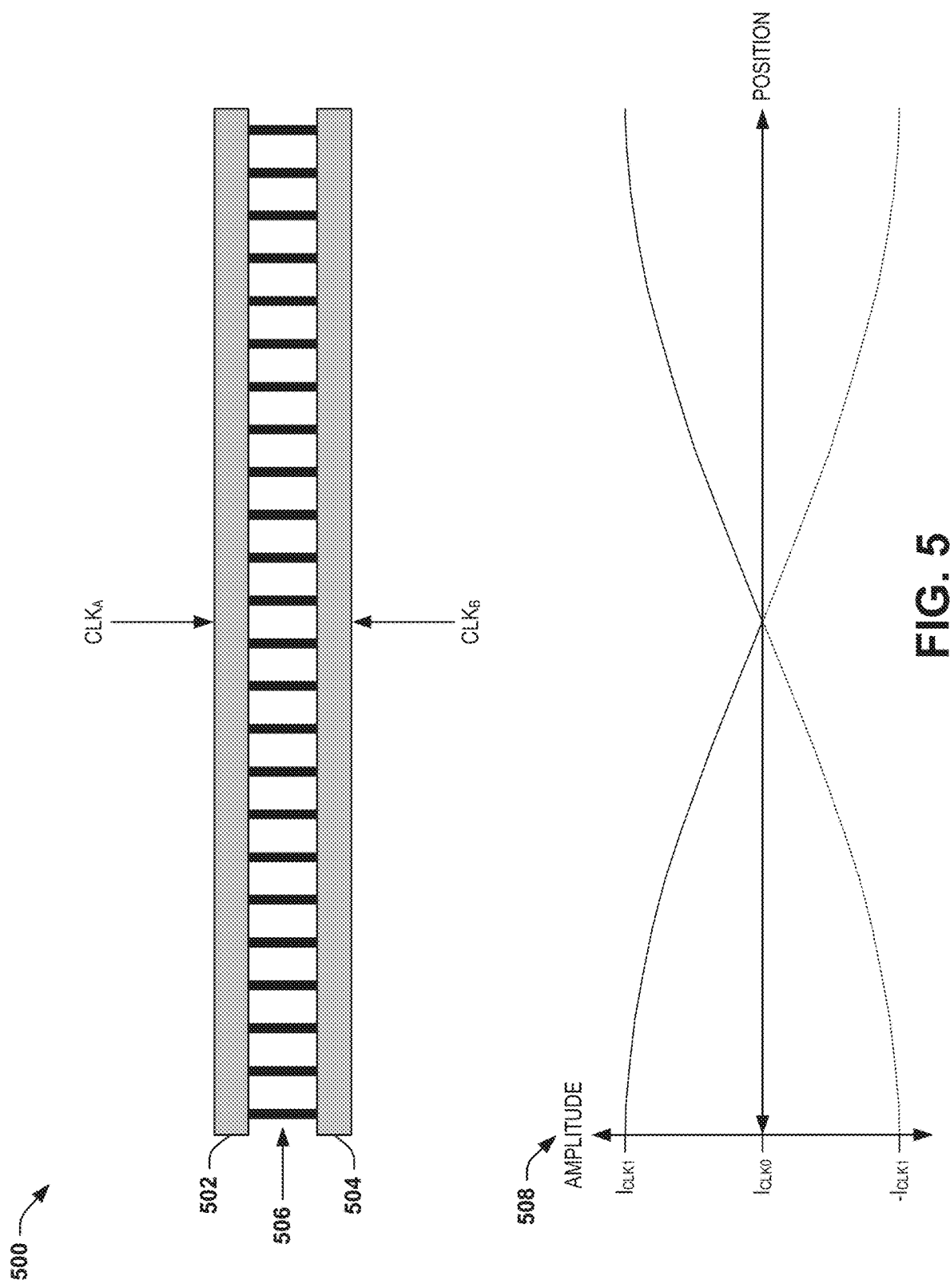
FIG. 5 illustrates an example diagram of resonator spines.

FIG. 5 illustrates an example diagram 500 of resonator spines. The resonator spines are demonstrated in the example of FIG. 5 as a first resonator spine 502 and a second resonator spine 504. The first and second resonator spines 502 and 504 can correspond to approximately identical resonator spines, as described herein, to demonstrate the effects of a single coupling of the clock signal CLK to each of the first resonator spine 502 and the second resonator spine 504. The resonator spines 502 and 504 in the example of FIG. 5 therefore demonstrate the relative amplitude variation of the clock signal CLK propagating therein.

In the example of FIG. 5, the first and second resonator spines 502 and 504 are conductively coupled by a periodic arrangement of resonator ribs 506. The first resonator spine 502 is demonstrated as receiving the clock signal $CLK_A$ at an approximate midpoint along the length of the first resonator spine 502 and the resonator spine 504 is demonstrated as receiving the clock signal $CLK_B$ at an approximate midpoint along the length of the second resonator spine 504. Therefore, the clock signals $CLK_A$ and $CLK_B$ are conductively coupled to the respective first and second resonator spines 502 and 504 at an approximately same location along the length of the respective first and second resonator spines 502 and 504. As an example, the clock signals $CLK_A$ and $CLK_B$ can be approximately the same, such as described above in the example of FIG. 2.

In the example of FIG. 5, the variation of the voltage amplitude of the clock signals $CLK_A$ and $CLK_B$ is plotted along the length of the resonator spines 502 and 504 on a graph 508. Variations of the frequency of the clock signals $CLK_A$ and $CLK_B$ can result in amplitude variations of the clock signals $CLK_A$ and $CLK_B$ along the length of the resonator spines 502 and 504. The amplitude of the clock signals $CLK_A$ and $CLK_B$ is demonstrated in the graph 508 as varying relative to an amplitude $I_{CLK0}$ that corresponds to a frequency of the clock signals $CLK_A$ and $CLK_B$ that is equal to the resonant frequency of the first and second resonator spines 502 and 504. Therefore, the amplitude of the clock signals $CLK_A$ and $CLK_B$ varies along the length of the resonator spines 502 and 504 based on a variation in frequency of the clock signals $CLK_A$ and $CLK_B$ relative to the resonant frequency of the resonator spines 502 and 504.

In the example of FIG. 5, the solid line amplitude in the graph 508 corresponds to a frequency of the clock signals $CLK_A$ and $CLK_B$ that is greater than the resonant frequency of the resonator spines 502 and 504, and the dotted line amplitude in the graph 508 corresponds to a frequency of the clock signals $CLK_A$ and $CLK_B$ that is less than the resonant frequency of the resonator spines 502 and 504 (e.g., approximately equal and opposite the resonant frequency relative to the solid line). As demonstrated in the example of FIG. 5, the amplitude of the clock signals $CLK_A$ and $CLK_B$, driven above the resonant frequency of the resonator spines 502 and 504, is demonstrated as varying along the length of the resonator spines 502 and 504 from the amplitude $I_{CLK0}$ at a location of the conductive coupling of the clock signals $CLK_A$ and $CLK_B$ to the respective first and second resonator spines 502 and 504 to an amplitude $I_{CLK1}$ at the distal ends of the first and second resonator spines 502 and 504. Similarly, the amplitude of the clock signals $CLK_A$ and $CLK_B$, driven below the resonant frequency of the resonator spines 502 and 504, is demonstrated as varying along the length of the resonator spines 502 and 504 from the amplitude $I_{CLK0}$ at a location of the conductive coupling of the clock signals $CLK_A$ and $CLK_B$ to the respective first and second resonator spines 502 and 504 to an amplitude $-I_{CLK1}$ at the distal ends of the first and second resonator spines 502 and 504. Therefore, at frequencies of the clock signals $CLK_A$ and $CLK_B$ that are greater than or less than the resonant frequency of the resonator spines 502 and 504, the amplitude of the clock signals $CLK_A$ and $CLK_B$ can exhibit errors relative to the amplitude $I_{CLK0}$ along the length of the resonator spines 502 and 504 at distances away from the conductive coupling of the clock signals $CLK_A$ and $CLK_B$ to the respective first and second resonator spines 502 and 504.

Figure 6:
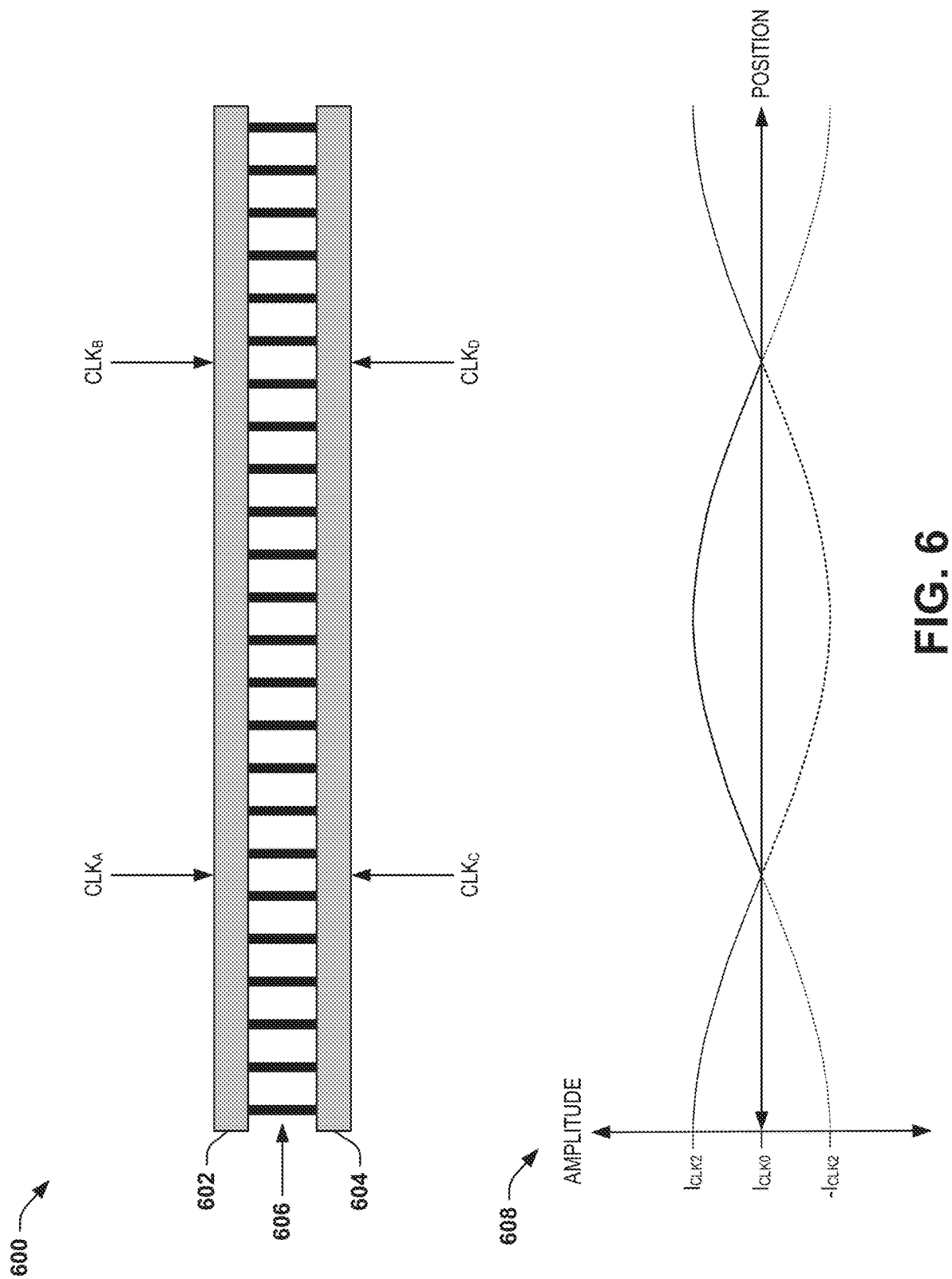
FIG. 6 illustrates another example diagram of resonator spines.

FIG. 6 illustrates another example diagram 600 of resonator spines. The resonator spines are demonstrated in the example of FIG. 6 as a first resonator spine 602 and a second resonator spine 604. The first and second resonator spines 602 and 604 can correspond to approximately identical resonator spines, as described herein, to demonstrate the effects of multiple couplings of the clock signal CLK to each of the first resonator spine 602 and the second resonator spine 604. The resonator spines 602 and 604 in the example of FIG. 6 therefore demonstrate the relative amplitude variation of the clock signal CLK propagating therein.

In the example of FIG. 6, the first and second resonator spines 602 and 604 are conductively coupled by a periodic arrangement of resonator ribs 606. The first resonator spine 602 is demonstrated as receiving a clock signal $CLK_A$ and a clock signal $CLK_B$ at points approximately one quarter of the length of the first resonator spine 602 from the respective ends of the first resonator spine 602. Similarly, the second resonator spine 604 is demonstrated as receiving a clock signal $CLK_C$ and a clock signal $CLK_D$ at points approximately one quarter of the length of the second resonator spine 604 from the respective ends of the second resonator spine 604. Therefore, the clock signals $CLK_A$ and $CLK_C$ are located at approximately the same location along the lengths of the respective resonator spines 602 and 604, and the clock signals $CLK_B$ and $CLK_D$ are located at approximately the same location along the lengths of the respective resonator spines 602 and 604.

In the example of FIG. 6, the variation of the voltage amplitude of the clock signals $CLK_A$, $CLK_B$, $CLK_C$, and $CLK_D$ is plotted along the length of the resonator spines 602 and 604 on a graph 608. Similar to as described above in the example of FIG. 5, inherent variations of the frequency of the clock signals $CLK_A$, $CLK_B$, $CLK_C$, and $CLK_D$ can result in amplitude variations of the clock signals $CLK_A$, $CLK_B$, $CLK_C$, and $CLK_D$ along the length of the resonator spines 602 and 604 relative to the amplitude $I_{CLK0}$ (e.g., corresponding to the resonant frequency of the first and second resonator spines 602 and 604). Therefore, the amplitude of the clock signals $CLK_A$, $CLK_B$, $CLK_C$, and $CLK_D$ varies along the length of the resonator spines 602 and 604 based on a variation in frequency of the clock signals $CLK_A$ and $CLK_B$ relative to the resonant frequency of the resonator spines 602 and 604.

In the example of FIG. 6, the solid line amplitude in the graph 608 corresponds to a frequency of the clock signals $CLK_A$, $CLK_B$, $CLK_C$, and $CLK_D$ that is greater than the resonant frequency of the resonator spines 602 and 604, and the dotted line amplitude in the graph 608 corresponds to a frequency of the clock signals $CLK_A$, $CLK_B$, $CLK_C$, and $CLK_D$ that is less than the resonant frequency of the resonator spines 602 and 604 (e.g., approximately equal and opposite the resonant frequency relative to the solid line). As demonstrated in the example of FIG. 6, the amplitude of the clock signals $CLK_A$, $CLK_B$, $CLK_C$, and $CLK_D$, driven above the resonant frequency of the resonator spines 602 and 604, is demonstrated as varying along the length of the resonator spines 602 and 604 from the amplitude $I_{CLK0}$ at locations of the conductive coupling of the clock signals $CLK_A$, $CLK_B$, $CLK_C$, and $CLK_D$ to the respective first and second resonator spines 602 and 604 to an amplitude $I_{CLK2}$ between the conductive couplings of the clock signals $CLK_A$, $CLK_B$, $CLK_C$, and $CLK_D$ to the respective first and second resonator spines 602 and 604 and at the distal ends of the first and second resonator spines 602 and 604. Similarly, the amplitude of the clock signals $CLK_A$, $CLK_B$, $CLK_C$, and $CLK_D$, driven below the resonant frequency of the resonator spines 602 and 604, is demonstrated as varying along the length of the resonator spines 602 and 604 from the amplitude $I_{CLK0}$ at locations of the conductive coupling of the clock signals $CLK_A$, $CLK_B$, $CLK_C$, and $CLK_D$ to the respective first and second resonator spines 602 and 604 to an amplitude $-I_{CLK2}$ between the conductive couplings of the clock signals $CLK_A$, $CLK_B$, $CLK_C$, and $CLK_D$ to the respective first and second resonator spines 602 and 604 and at the distal ends of the first and second resonator spines 602 and 604.

The amplitude $I_{CLK2}$ in the example of FIG. 6 is less than the amplitude $I_{CLK1}$ in the example of FIG. 5. Therefore, the diagram 600 demonstrates that multiple conductive couplings of the clock signal CLK along the length of a resonator spine results in suppression of amplitude variations of the clock signal CLK resulting from frequency deviations of the clock signal CLK (e.g., relative to the resonant frequency of the respective resonator spine). Accordingly, by providing multiple couplings of the clock signal CLK to a given resonator spine, the amplitude of the clock signal CLK can exhibit greater uniformity along the length of the respective resonator spine.

Referring back to the example of FIG. 4, as described above, the first and second resonator spine 402 and 404 can have an approximately equal length. The example of FIG. 4 demonstrates that the coupling of the clock signals $CLK_A$ through $CLK_F$ to the first resonator spine 402 is staggered relative to the coupling of the clock signals $CLK_G$ through $CLK_K$ to the second resonator spine 404. Therefore, the coupling of a set of the resonant transmission lines 204 to the first resonator spine 402 is offset from the coupling of a set of the resonant transmission lines 204 to the second resonator spine 404 along the relative lengths of the first and second resonator spines from a first end of the each of the first and second resonator spines 402 and 404 to a second end of each of the first and second resonator spines 402 and 404.

As also described above, at least one of the resonator ribs 408 in a given set of the resonator ribs 408 can be conductively coupled to both of the first and second resonator spines 402 and 404. As a result, based on the relative staggered coupling of the resonant transmission lines 204 to the resonator spines 402 and 404, based on the coupling of the resonator ribs 408 to both of the resonator spines 402 and 404, and based on the dimensions of the resonator ribs 408 (e.g., approximately equal in length to a wavelength of the clock signal CLK), the amplitude variations of the clock signal CLK can be further suppressed. For example, the portions of the resonator spine 402 between sets of resonator ribs 408 that do not have a conductive coupling to a resonator 204 can likewise exhibit suppression of the amplitude variation of the clock signal CLK, similar to portions of the resonator spines 402 and 404 that have direct conductive coupling to the resonant transmission lines 204. Accordingly, the amplitude variations of the clock signal CLK can be suppressed on multiple resonator spines based on fewer conductive couplings to resonant transmission lines of the resonator feed network, thus reducing circuit complexity and cost.

Figure 7:
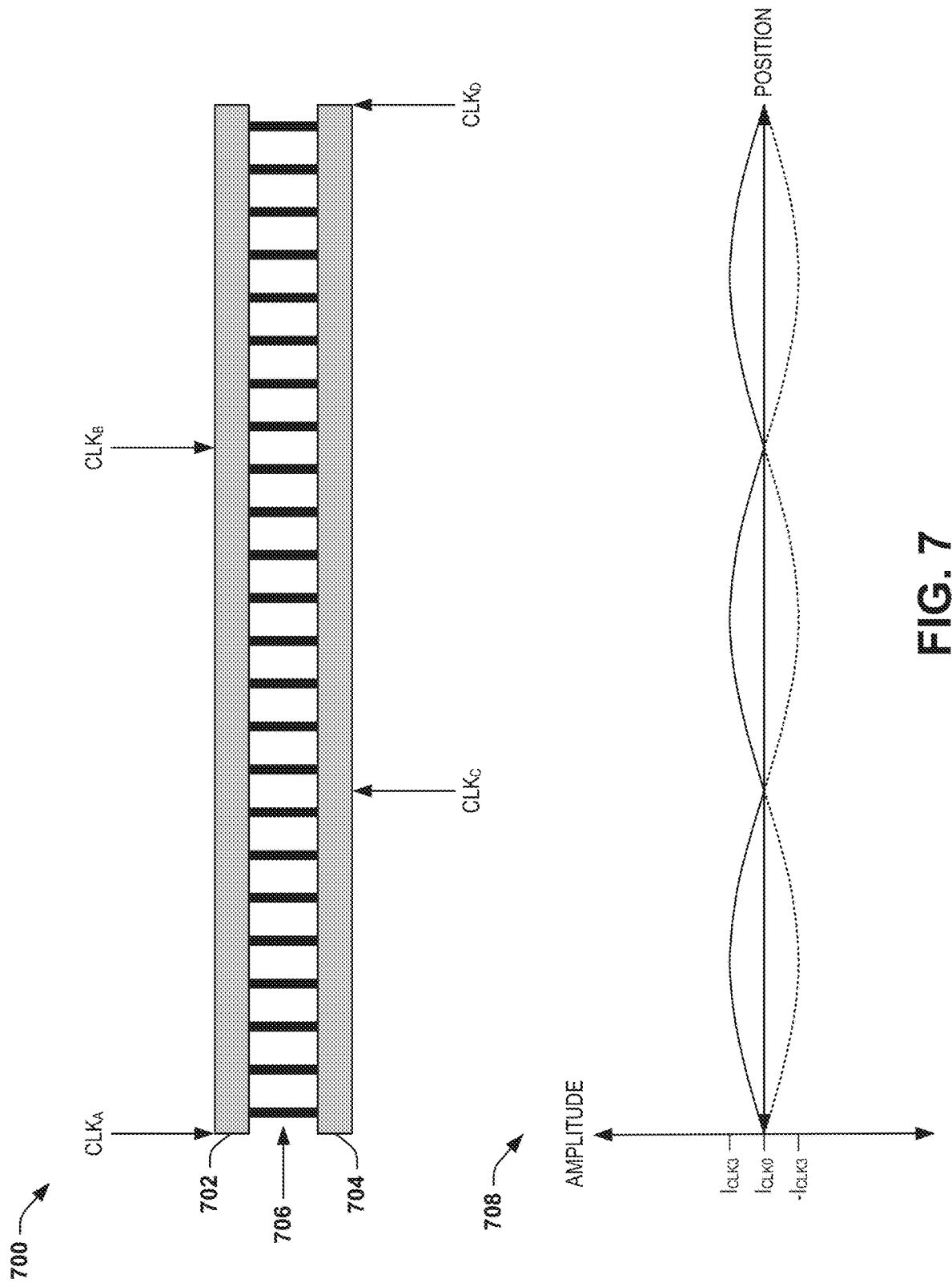
FIG. 7 illustrates another example diagram of resonator spines.

As described above, amplitude variations of the clock signal CLK resulting from additional frequency modes that deviate from the resonant frequency of a resonator spine can be suppressed based on the multiple conductive couplings of the clock signal CLK to the resonator spine. FIG. 7 illustrates another example diagram 700 of resonator spines. The resonator spines are demonstrated in the example of FIG. 7 as a first resonator spine 702 and a second resonator spine 704. The first and second resonator spines 702 and 704 can correspond to approximately identical resonator spines, as described herein, to demonstrate the effects of multiple couplings of the clock signal CLK to each of the first resonator spine 702 and the second resonator spine 704. The resonator spines 702 and 704 in the example of FIG. 7 therefore demonstrate the relative amplitude variation of the clock signal CLK propagating therein.

In the example of FIG. 7, the first and second resonator spines 702 and 704 are conductively coupled by a periodic arrangement of resonator ribs 706. The first resonator spine 702 is demonstrated as receiving a clock signal $CLK_A$ at a first end of the first resonator spine 702 and a clock signal $CLK_B$ at approximate two-thirds the length of the first resonator spine 702 from the first end of the first resonator spine 702. Similarly, the second resonator spine 704 is demonstrated as receiving a clock signal $CLK_C$ at approximate one-third the length of the second resonator spine 704 from the first end of the second resonator spine 704 and a clock signal $CLK_D$ at a second end of the second resonator spine 704 opposite the first end. Therefore, the clock signals $CLK_A$, $CLK_B$, $CLK_C$, and $CLK_D$ are staggered along the lengths of the respective resonator spines 702 and 704, similar to as described above in the example of FIG. 4.

In the example of FIG. 7, the variation of the voltage amplitude of the clock signals $CLK_A$, $CLK_B$, $CLK_C$, and $CLK_D$ is plotted along the length of the resonator spines 702 and 704 on a graph 708. Similar to as described above in the example of FIG. 5, inherent variations of the frequency of the clock signals $CLK_A$, $CLK_B$, $CLK_C$, and $CLK_D$ can result in amplitude variations of the clock signals $CLK_A$, $CLK_B$, $CLK_C$, and $CLK_D$ along the length of the resonator spines 702 and 704 relative to the amplitude $I_{CLK0}$ (e.g., corresponding to the resonant frequency of the first and second resonator spines 702 and 704). Therefore, the amplitude of the clock signals $CLK_A$, $CLK_B$, $CLK_C$, and $CLK_D$ varies along the length of the resonator spines 702 and 704 based on a variation in frequency of the clock signals $CLK_A$ and $CLK_B$ relative to the resonant frequency of the resonator spines 702 and 704.

In the example of FIG. 7, the solid line amplitude in the graph 708 corresponds to a frequency of the clock signals $CLK_A$, $CLK_B$, $CLK_C$, and $CLK_D$ that is greater than the resonant frequency of the resonator spines 702 and 704, and the dotted line amplitude in the graph 708 corresponds to a frequency of the clock signals $CLK_A$, $CLK_B$, $CLK_C$, and $CLK_D$ that is less than the resonant frequency of the resonator spines 702 and 704 (e.g., approximately equal and opposite the resonant frequency relative to the solid line). As demonstrated in the example of FIG. 7, the amplitude of the clock signals $CLK_A$, $CLK_B$, $CLK_C$, and $CLK_D$, driven above the resonant frequency of the resonator spines 702 and 704, is demonstrated as varying along the length of the resonator spines 702 and 704 from the amplitude $I_{CLK0}$ at locations of any of the conductive coupling of the clock signals $CLK_A$, $CLK_B$, $CLK_C$, and $CLK_D$ to the respective one of the first and second resonator spines 702 and 704 to an amplitude Imo between any of the conductive couplings of the clock signals $CLK_A$, $CLK_B$, $CLK_C$, and $CLK_D$ to the respective first and second resonator spines 702 and 704. Similarly, the amplitude of the clock signals $CLK_A$, $CLK_B$, $CLK_C$, and $CLK_D$, driven below the resonant frequency of the resonator spines 702 and 704, is demonstrated as varying along the length of the resonator spines 702 and 704 from the amplitude $I_{CLK0}$ at any of the locations of the conductive coupling of the clock signals $CLK_A$, $CLK_B$, $CLK_C$, and $CLK_D$ to the respective first and second resonator spines 702 and 704 to an amplitude $-I_{CLK3}$ between any of the conductive couplings of the clock signals $CLK_A$, $CLK_B$, $CLK_C$, and $CLK_D$ to the respective first and second resonator spines 702 and 704.

The amplitude $I_{CLK3}$ in the example of FIG. 7 is less than the amplitude $I_{CLK2}$ in the example of FIG. 6. Therefore, the diagram 700 demonstrates that multiple conductive couplings of the clock signal CLK at staggered locations along the length of multiple resonator spines relative to each other, with cross-conductive coupling via resonator ribs, results in further suppression of amplitude variations of the clock signal CLK resulting from frequency deviations of the clock signal CLK (e.g., relative to the resonant frequency of the respective resonator spine). Accordingly, by providing multiple staggered couplings of the clock signal CLK to a multiple resonator spines, with the staggering being relative to each other on the different resonator spines, the amplitude of the clock signal CLK can exhibit greater uniformity along the length of the respective resonator spines. As described above in the example of FIG. 4, by providing fewer conductive couplings to resonant transmission lines of the resonator feed network, the complexity and cost of the resonator feed network that provides the clock signal CLK can be significantly reduced.

As a result of the amplitude variation suppression described herein, fabrication process tolerance mismatches that can result in changes to the frequency of the clock signal CLK and/or the resonant frequency of the respective resonator spine can be compensated for by coupling the clock signal to multiple locations along the length of the one or more resonator spines. Accordingly, similar to as described above, resonator ribs (e.g., the resonator ribs 408 in the example of FIG. 4) can be conductively coupled at multiple locations along the length of the resonator spine 704 to propagate the clock signal CLK at approximately uniform amplitudes.

Figure 8:
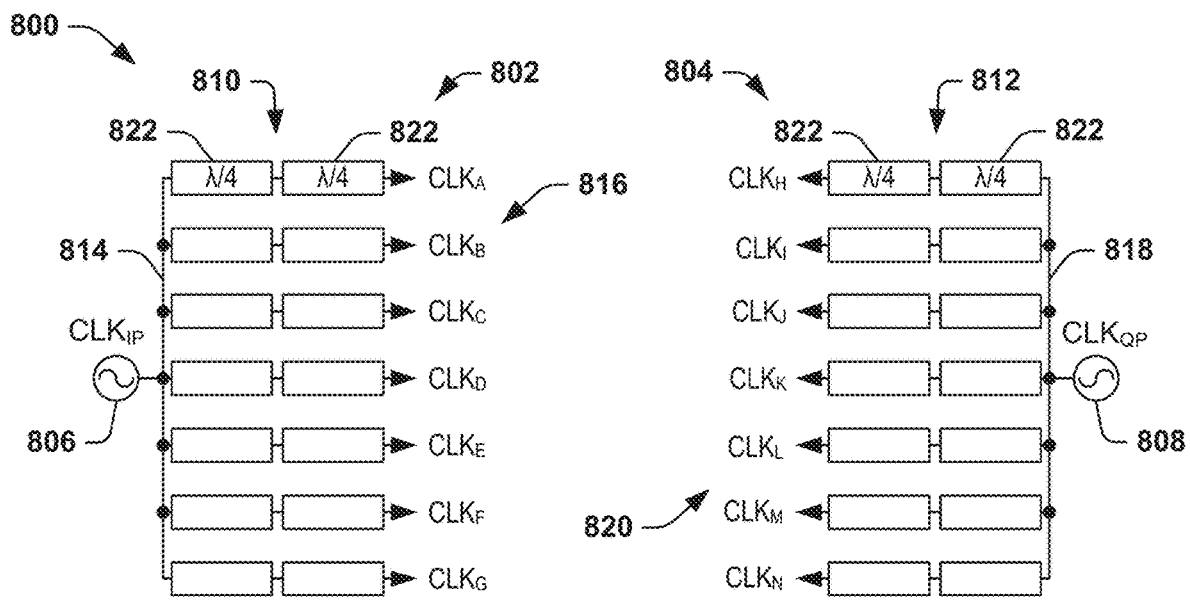
FIG. 8 illustrates an example of a resonator feed network.

FIG. 8 illustrates an example diagram 800 of resonator feed networks. The diagram 800 include a first resonator feed network 802 and second resonator feed network 804. As an example, the resonator feed networks 802 and 804 can be coupled to the substrate of a carrier supporting multiple ICs (e.g., via bump bonds) to provide the clock signal CLK to the remaining portions of a given resonator system (e.g., resonator spine(s) and rib(s) on multiple ICs), as described herein. The resonator feed networks 802 and 804 can correspond to one or more of the resonator feed network(s) 106 in the example of FIG. 1. Therefore, reference is to be made to the example of FIG. 1 in the following description of the example of FIG. 8.

The first resonator feed network 802 includes an oscillator 806 configured to generate an in-phase portion of the clock signal, demonstrated as an in-phase clock signal $CLK_{IP}$. Similarly, the second resonator feed network 804 includes an oscillator 808 configured to generate a quadrature-phase portion of the clock signal, demonstrated as a quadrature-phase clock signal $CLK_{QP}$. As an example, the in-phase and quadrature-phase clock signals $CLK_{IP}$ and $CLK_{QP}$ can be sinusoidal clock signals. For example, the in-phase and quadrature-phase clock signals $CLK_{IP}$ and $CLK_{QP}$ can be provided in a reciprocal quantum logic (RQL) circuit system.

In the example of FIG. 8, the first resonator feed network 802 also includes a plurality of resonant transmission lines 810 and the second resonator feed network 804 includes a plurality of resonant transmission lines 812. The resonant transmission lines 810 are demonstrated as conductively coupled together and to the oscillator 806 at a node 814 at a first end, and include respective outputs 816 at a second end. Similarly, the resonant transmission lines 812 are demonstrated as conductively coupled together and to the oscillator 808 at a node 818 at a first end, and include respective outputs 820 at a second end. In the example of FIG. 8, the outputs 816 and 820 are each demonstrated as a quantity of seven, and thus provide respective approximately identical clock signals $CLK_A$ through $CLK_G$ and clock signals $CLK_H$ through $CLK_N$, respectively. However, other quantities greater than or less than seven for each of the resonator feed networks 802 and 804 are possible for the clock distribution system, as described herein. As described herein, the clock signals $CLK_A$ through $CLK_G$ correspond to approximately equal copies of the in-phase clock signal $CLK_{IP}$, and the clock signals $CLK_H$ through $CLK_N$ correspond to approximately equal copies of the quadrature-phase clock signal $CLK_{QP}$. Therefore, the clock signals $CLK_A$ through $CLK_N$ are all approximately equal with respect to frequency and amplitude, with the clock signals $CLK_H$ through $CLK_N$ being approximately 90° out-of-phase relative to the clock signals $CLK_A$ through $CLK_G$.

Similar to as described above in the example of FIG. 2, the resonant transmission lines 810 and 812 are each demonstrated as including two transmission line segments 822 that each have a length of λ/4. Therefore, the total length of each of the resonant transmission lines 810 and 812 is approximately λ/2, and thus approximately half the wavelength of the clock signal CLK. As a result, the length between any two of the outputs 816 or between any two of the outputs 820, through a total of four of the transmission line segments 822, is approximately one wavelength "λ" of the clock signals $CLK_{IP}$ and $CLK_{QP}$.

Figure 9:
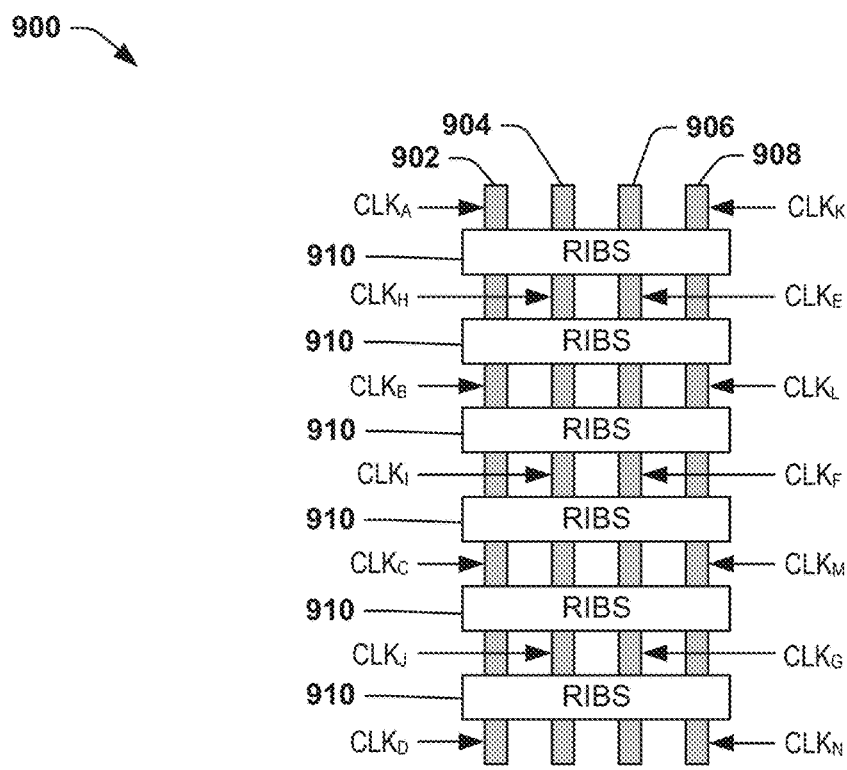
FIG. 9 illustrates another example of a clock distribution system.

FIG. 9 illustrates another example of a clock distribution system 900. The clock distribution system 900 can correspond to a portion of the clock distribution system 102 in the example of FIG. 1. Therefore, reference is to be made to the example of FIGS. 1 and 8 in the following description of the example of FIG. 9.

The clock distribution system 900 includes a first resonator spine 902, a second resonator spine 904, a third resonator spine 906, and a fourth resonator spine 908. The clock distribution system 900 also includes a plurality of sets of resonator ribs 912 that are each coupled to one or more of the resonator spines 902, 904, 906 and 908. The resonator spines 902, 904, 906 and 908 can nominally be fabricated to be approximately equal in length.

The first and third resonator spines 902 and 906 receive the in-phase clock signal $CLK_{IP}$, demonstrated as the respective clock signals $CLK_A$ through $CLK_G$ as described above. In the example of FIG. 9, the clock signals $CLK_A$ through $CLK_D$ are provided to the first resonator spine 902 and the clock signals $CLK_E$ through $CLK_G$ are provided to the third resonator spine 906. Similarly, the second and fourth resonator spines 904 and 908 receive the quadrature-phase clock signal $CLK_{QP}$, demonstrated as the respective clock signals $CLK_H$ through $CLK_N$ as described above. The clock signals $CLK_H$ through $CLK_J$ are provided to the second resonator spine 904 and the clock signals $CLK_K$ through $CLK_N$ are provided to the fourth resonator spine 908.

The clock signals $CLK_A$ through $CLK_G$ can be provided at locations along the length of the resonator spines 902 and 906 and the clock signals $CLK_H$ through $CLK_N$ can be provided at locations along the length of the resonator spines 904 and 908 at predetermined equal intervals between the respective sets of resonator ribs 910. As an example, the intervals between each of the conductive coupling of the clock signals $CLK_A$ through $CLK_N$ to the resonator spines 902, 904, 906, and 908 can be approximately equal along the length of the respective resonator spines 902, 904, 906, and 908.

As an example, each of the resonator ribs 912 can be selective coupled to one or more of the resonator spines 902, 904, 906 and 908, such as to propagate the in-phase clock signal $CLK_{IP}$, the quadrature-phase clock signal $CLK_{QP}$, or a combination (e.g., varying phase) therebetween. As described above, the clock distribution system 900 can include circuits (not shown in the example of FIG. 9) that are coupled (e.g., inductively) to the resonator ribs 912.

Each of the resonator spines 902, 904, 906, and 908 can therefore suppress amplitude variations of the respective clock signals $CLK_{IP}$ and $CLK_{QP}$, similar to as described previously. For example, based on the coupling of multiple copies of the respective clock signals $CLK_{IP}$ and $CLK_{QP}$ (e.g., the clock signals $CLK_A$ through $CLK_D$ to the first resonator spine 902, the clock signals $CLK_H$ through $CLK_J$ to the second resonator spine 904, the clock signals $CLK_E$ through $CLK_G$ to the third resonator spine 906, and the clock signals $CLK_K$ through $CLK_N$ to the fourth resonator spine 908), the clock signals $CLK_{IP}$ and $CLK_{QP}$ can propagate with a substantially more uniform amplitude along the length of the resonator spines 902, 904, 906, and 908, as described above. Furthermore, amplitude variations of the clock signals $CLK_{IP}$ and $CLK_{QP}$ resulting from additional frequency modes that deviate from the resonant frequency of the respective first and second resonator spines 902, 904, 906, and 908 can be suppressed based on the multiple conductive couplings of the clock signals $CLK_{IP}$ and $CLK_{QP}$ to the respective resonator spines 902, 904, 906, and 908, as described above.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A clock distribution system comprising:
   a resonator feed network comprising a plurality of resonant transmission lines that each propagate a clock signal;
   a plurality of resonator spines, each of the resonator spines being conductively coupled to at least one of the resonant transmission lines, such that each of the resonator spines propagates the clock signal; and
   at least one resonator rib conductively coupled to at least two of the resonator spines, each of the at least one resonator rib being arranged as a standing wave resonator to propagate the clock signal.

2. The system of claim 1, wherein each of the resonator spines is conductively coupled to a plurality of the resonant transmission lines of the resonator feed network at each of a plurality of locations separated by at least one interval along a length of the respective one of the resonator spines.

3. The system of claim 2, wherein each of the at least one interval is approximately equal in length.

4. The system of claim 1, wherein the plurality of resonant transmission lines comprises a first set of resonant transmission lines and a second set of resonant transmission lines, each of the first and second sets of resonant transmission lines having a quantity greater than one, wherein the first set of resonant transmission lines is coupled to a first resonator spine of the plurality of resonator spines and the second set of resonant transmission lines is coupled to a second resonator spine of the plurality of resonator spines, each of the first and second resonator spines being conductively coupled to a same one of the at least one resonator rib.

5. The system of claim 4, wherein the first and second resonator spines are approximately equal in length, wherein the coupling of the first set of resonant transmission lines to the first resonator spine is offset from the coupling of the second set of resonant transmission lines to the second resonator spine along relative lengths of the first and second resonator spines from a first end of the each of the first and second resonator spines to a second end of each of the first and second resonator spines.

6. The system of claim 1, wherein each of the resonant transmission lines of the resonator feed network are conductively coupled to each other and to a clock source at a first end of each of the resonant transmission lines and are conductively coupled to a respective one of the resonator spines at a second end of the respective resonant transmission lines.

7. The system of claim 6, wherein each of the resonant transmission lines comprises at least one transmission line having a respective length to provide for a total length of the resonator approximately equal to one-half of a wavelength of the clock signal, such that a total distance between a first conductive coupling of a first resonator of the resonant transmission lines to a respective one of the resonator spines and a second conductive coupling of a second resonator of the resonant transmission lines to the respective one of resonator spines is separated by approximately one wavelength of the clock signal through the first and second resonant transmission lines.

8. The system of claim 1, wherein the resonator feed network comprises:
   a first resonator feed network comprising a first plurality of resonant transmission lines that each propagate an in-phase clock signal; and
   a second resonator feed network comprising a second plurality of resonant transmission lines that each propagate a quadrature-phase clock signal;
   wherein the resonator spines comprise:
   at least one first resonator spine conductively coupled to the first plurality of resonant transmission lines, such that each of the at least one first resonator spine propagates the in-phase clock signal; and
   at least one second resonator spine conductively coupled to the second plurality of resonant transmission lines, such that each of the at least one second resonator spine propagates the quadrature-phase clock signal.

9. The system of claim 1, further comprising at least one transformer-coupling line, each of the at least one transformer-coupling line being conductively coupled to an associated circuit and having at least one inductive coupling to the at least one resonator rib to inductively generate a clock current corresponding to the clock signal via the inductive coupling to provide functions for the associated circuit.

10. A clock distribution system comprising:
    a resonator feed network comprising a plurality of resonant transmission lines that each propagate a clock signal;
    at least one resonator spine, each of the at least one resonator spine being conductively coupled to at least one of the resonant transmission lines a plurality of the resonant transmission lines of the resonator feed network at each of a plurality of locations separated by at least one interval along a length of the respective one of the at least one resonator spine, such that each of the at least one resonator spine propagates the clock signal; and
    at least one resonator rib conductively coupled to at least one of the at least one resonator spine, each of the at least one resonator rib being arranged as a standing wave resonator to propagate the clock signal.

11. The system of claim 10, wherein the at least one resonator spine comprises a plurality of resonator spines, wherein each of the at least one resonator rib is conductively coupled to a plurality of the plurality of resonator spines, wherein the plurality of resonant transmission lines comprises a first set of resonant transmission lines and a second set of resonant transmission lines, each of the first and second sets of resonant transmission lines having a quantity greater than one, wherein the first set of resonant transmission lines is coupled to a first resonator spine of the plurality of resonator spines and the second set of resonant transmission lines is coupled to a second resonator spine of the plurality of resonator spines, each of the first and second resonator spines being conductively coupled to a same one of the at least one resonator rib.

12. The system of claim 11, wherein the first and second resonator spines are approximately equal in length, wherein the coupling of the first set of resonant transmission lines to the first resonator spine is offset from the coupling of the second set of resonant transmission lines to the second resonator spine along relative lengths of the first and second resonator spines from a first end of the each of the first and second resonator spines to a second end of each of the first and second resonator spines.

13. The system of claim 10, wherein each of the resonant transmission lines of the resonator feed network are conductively coupled to each other and to a clock source at a first end of each of the resonant transmission lines and are conductively coupled to the at least one resonator spine at a second end of the respective resonant transmission lines, wherein each of the resonant transmission lines comprises at least one transmission line having a respective length to provide for a total length of the resonator approximately equal to one-half of a wavelength of the clock signal, such that a total distance between a first conductive coupling of a first resonator of the resonant transmission lines to the at least one resonator spine and a second conductive coupling of a second resonator of the resonant transmission lines to the at least one resonator spine is separated by approximately one wavelength of the clock signal through the first and second resonant transmission lines.

14. The system of claim 10, wherein the resonator feed network comprises:
   a first resonator feed network comprising a first plurality of resonant transmission lines that each propagate an in-phase clock signal; and
   a second resonator feed network comprising a second plurality of resonant transmission lines that each propagate a quadrature-phase clock signal;
   wherein the at least one resonator spine comprises:
   at least one first resonator spine conductively coupled to the first plurality of resonant transmission lines, such that each of the at least one first resonator spine propagates the in-phase clock signal; and
   at least one second resonator spine conductively coupled to the second plurality of resonant transmission lines, such that each of the at least one second resonator spine propagates the quadrature-phase clock signal.

15. A clock distribution system comprising:
   a resonator feed network comprising a first set of resonant transmission lines and a second set of resonant transmission lines, each of the first and second sets of resonant transmission lines having a quantity greater than one and being configured to propagate a clock signal;
   a first resonator spine conductively coupled to the first set of resonant transmission lines, such that the first resonator spine propagates the clock signal;
   a second resonator spine conductively coupled to the second set of resonant transmission lines, such that the second resonator spine propagates the clock signal; and
   at least one resonator rib conductively coupled to each of the first and second resonator spines, each of the at least one resonator rib being arranged as a standing wave resonator to propagate the clock signal.

16. The system of claim 15, wherein the first and second resonator spines are approximately equal in length, wherein the coupling of the first set of resonant transmission lines to the first resonator spine is offset from the coupling of the second set of resonant transmission lines to the second resonator spine along relative lengths of the first and second resonator spines from a first end of the each of the first and second resonator spines to a second end of each of the first and second resonator spines.

17. The system of claim 15, wherein each of the resonant transmission lines of the first and second sets of resonant transmission lines are conductively coupled to each other and to a clock source at a first end of each of the resonant transmission lines and are conductively coupled to one of the first and second resonator spines at a second end of the respective resonant transmission lines.

18. The system of claim 17, wherein each of the resonant transmission lines of the first and second sets of resonant transmission lines comprises at least one transmission line having a respective length to provide for a total length of the resonator approximately equal to one-half of a wavelength of the clock signal, such that a total distance between a first conductive coupling of a first resonator of the resonant transmission lines to one of the first and second resonator spines and a second conductive coupling of a second resonator of the resonant transmission lines to one of the first and second resonator spines is separated by approximately one wavelength of the clock signal through the first and second resonant transmission lines.

19. The system of claim 15, further comprising at least one transformer-coupling line, each of the at least one transformer-coupling line being conductively coupled to an associated circuit and having at least one inductive coupling to the at least one resonator rib to inductively generate a clock current corresponding to the clock signal via the inductive coupling to provide functions for the associated circuit.

* * * * *